(12) United States Patent
Wan

(10) Patent No.: US 8,010,394 B2
(45) Date of Patent: Aug. 30, 2011

(54) SYSTEM AND METHOD TO FACILITATE YEARLY INVENTORY FORECASTING FOR NETWORK-BASED ENTITIES

(75) Inventor: Xia Sharon Wan, Saratoga, CA (US)

(73) Assignee: Yahoo! Inc., Sunnyvale, CA (US)

( * ) Notice: Subject to any disclaimer, the term of this patent is extended or adjusted under 35 U.S.C. 154(b) by 841 days.

(21) Appl. No.: 11/946,660

(22) Filed: Nov. 28, 2007

(65) Prior Publication Data

US 2009/0138301 A1   May 28, 2009

(51) Int. Cl.
*G06F 17/18* (2006.01)
*G06F 17/10* (2006.01)
*G06F 17/15* (2006.01)
*G06F 15/18* (2006.01)
*G06Q 10/00* (2006.01)

(52) U.S. Cl. ............................. 705/7; 705/7.12; 706/21

(58) Field of Classification Search ..................... 705/7
See application file for complete search history.

(56) References Cited

U.S. PATENT DOCUMENTS 5,884,037 A * 3/1999 Aras et al. ..................... 709/226

\* cited by examiner

*Primary Examiner* — Jeffrey A Gaffin
*Assistant Examiner* — Nathan H Brown, Jr.
(74) *Attorney, Agent, or Firm* — Stattler-Suh PC

(57) ABSTRACT

A system and method to facilitate inventory forecasting of network traffic for a network-based entity are described. In one example, the method includes preprocessing historical data to obtain processed average data, applying modeling and forecasting techniques to the processed average data using a seasonal auto-regressive integrated moving average process to obtain forecasting results, and combining the forecasting results to output combined forecasting data, wherein the combining the forecasting results comprises receiving and storing yearly forecast results. In one implementation, the historical data is normalized by weekly average to obtain normalized data. In another implementation, trend and seasonality are removed from a set of processed data to obtain stationary data. In yet another implementation, yearly forecast results are received and stored.

18 Claims, 4 Drawing Sheets

SYSTEM AND METHOD TO FACILITATE YEARLY INVENTORY FORECASTING FOR NETWORK-BASED ENTITIES

FIELD OF THE INVENTION

The present invention relates generally to the field of network-based communications and, more particularly, to a system and method to facilitate forecasting of traffic, such as, for example, page views, for network-based entities.

BACKGROUND OF THE INVENTION

The explosive growth of the Internet as a publication and interactive communication platform has created an electronic environment that is changing the way business is transacted. As the Internet becomes increasingly accessible around the world, users need efficient tools to navigate the Internet and to find content available on various websites.

The increase in traffic such as, for example, in page views leads naturally to a growth in inventory of stored web traffic data, which needs to be processed and analyzed in an efficient manner to enable accurate forecasting of inventory and evaluation of associated revenue.

SUMMARY OF THE INVENTION

What is needed is an improved method having features for addressing the problems mentioned above and new features not yet discussed. Broadly speaking, the present invention fills these needs by providing a system and method to facilitate inventory forecasting of network traffic for a network-based entity. It should be appreciated that the present invention can be implemented in numerous ways, including as a method, a process, an apparatus, a system or a device. Inventive embodiments of the present invention are summarized below.

In one embodiment, a method of facilitating inventory forecasting of network traffic for a network-based entity is provided. The method comprises preprocessing historical data to obtain processed average data, applying modeling and forecasting techniques to the processed average data using a seasonal auto-regressive integrated moving average process to obtain forecasting results, and combining the forecasting results to output combined forecasting data, wherein the combining the forecasting results comprises receiving and storing yearly forecast results. In this embodiment, the method may further comprise normalizing the historical data by weekly average to obtain normalized data. Alternatively, the method may further comprise modeling and removing trend and seasonality from a set of processed data to obtain stationary data. Alternatively, the method may further comprise receiving and storing weekly forecast results.

In another embodiment, computer system for facilitating inventory forecasting of network traffic for a network-based entity is provided. The computer system comprises a processor, memory, and an execution module for executing instructions comprising preprocessing historical data to obtain processed average data, applying modeling and forecasting techniques to the processed average data using a seasonal auto-regressive integrated moving average process to obtain forecasting results, and combining the forecasting results to output combined forecasting data, wherein the combining the forecasting results comprises receiving and storing yearly forecast results. In this embodiment, the instructions may further comprise normalizing the historical data by weekly average to obtain normalized data. Alternatively, the instructions may further comprise modeling and removing trend and seasonality from a set of processed data to obtain stationary data. Alternatively, the instruction may further comprise receiving and store weekly forecast results.

In still another embodiment, a computer readable medium carrying one or more instructions for facilitating inventory forecasting of network traffic for a network-based entity is provided. The one or more instructions, when executed by one or more processors, cause the one or more processors to perform the steps of preprocessing historical data to obtain processed average data, applying modeling and forecasting techniques to the processed average data using a seasonal auto-regressive integrated moving average process to obtain forecasting results, and combining the forecasting results to output combined forecasting data, wherein the combining the forecasting results comprises receiving and storing yearly forecast results. In this embodiment, the steps may further comprise normalizing the historical data by weekly average to obtain normalized data Other features and advantages of the present invention will be apparent from the accompanying drawings, and from the detailed description, which follows below.

BRIEF DESCRIPTION OF THE DRAWINGS

The present invention is illustrated by way of example and not intended to be limited by the figures of the accompanying drawings in which like references indicate similar elements and in which.

DETAILED DESCRIPTION

An invention is disclosed for a system and method to facilitate inventory forecasting of network traffic for a network-based entity. In the following description, numerous details are set forth for purpose of explanation. However, one of ordinary skill in the art will realize that the invention may be practiced without the use of the specific details. In other instances, well-known structures and devices are shown in block diagram form in order not to obscure the description of the invention with unnecessary detail. A device is hardware, software or a combination thereof.

In embodiments described in detail below, users access an entity, such as, for example, a content service provider, over a network such as the Internet and further input various data, which is subsequently captured by selective processing modules within the network-based entity. The user input typically comprises one or more "events." In one embodiment, an event is a type of action initiated by the user, typically through a conventional mouse click command. Events include, for example, advertisement clicks, search queries, search clicks, sponsored listing clicks, page views and advertisement views. However, events, as used herein, may include any type of online navigational interaction or search-related events.

Each of such events initiated by a user triggers a transfer of content information to the user, the content information being typically displayed in a web page on the user's client computer. Each of such events received at the network-based entity is stored within one or more data storage devices and further processed to predict network traffic, such as, for example, web page views, and associated revenue for the network-based entity.

Figure 1:
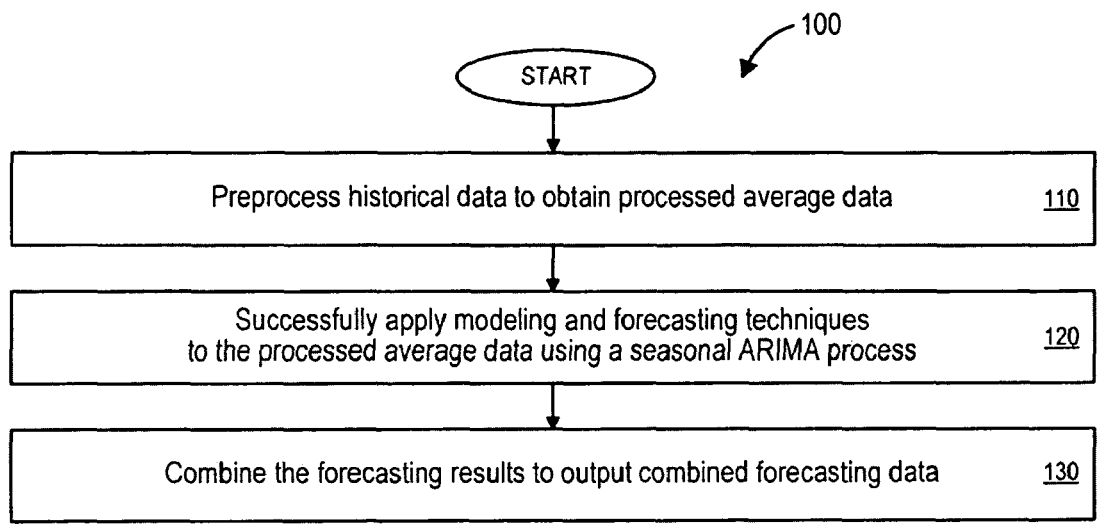
FIG. 1 is a flow diagram illustrating a method to facilitate forecasting of network traffic, according to one embodiment of the invention.

FIG. 1 is a flow diagram illustrating a method to facilitate forecasting of network traffic, according to one embodiment of the invention. As shown in FIG. 1, the sequence 100 starts at processing block 110 with pre-processing of historical data, such as, for example, web page views stored within a data storage device, such as, for example, a collection of weblogs, to obtain processed average data, such as, for example, weekly moving average data, as described in further detail below. In one embodiment, the pre-processing further includes outlier detection and removal, application of pattern or trend changes, and holiday effects modeling and removal, as described in further detail below.

Next, referring back to FIG. 1, at processing block 120, modeling and forecasting techniques are successively applied to the processed average data, such as, for example, using a seasonal Auto-Regressive Integrated Moving Average (ARIMA) model, as described in further detail below. In one embodiment, the modeling further includes a model identification device and a parameter estimation device, and the forecasting is further performed based on the model selected and estimated in the modeling procedure, as described in further detail below.

Finally, the sequence 100 continues at processing block 130 with a further combination of the forecasting results obtained through the previous successive application of modeling and forecasting techniques to output aggregated or combined forecasting data, as described in further detail below. In one embodiment, further post-processing procedures may be applied to the aggregated forecasting data, such as, for example, application of holiday effect adjustments on the forecasting data, in order to filter out any holiday effect on the forecasted data.

Figure 2:
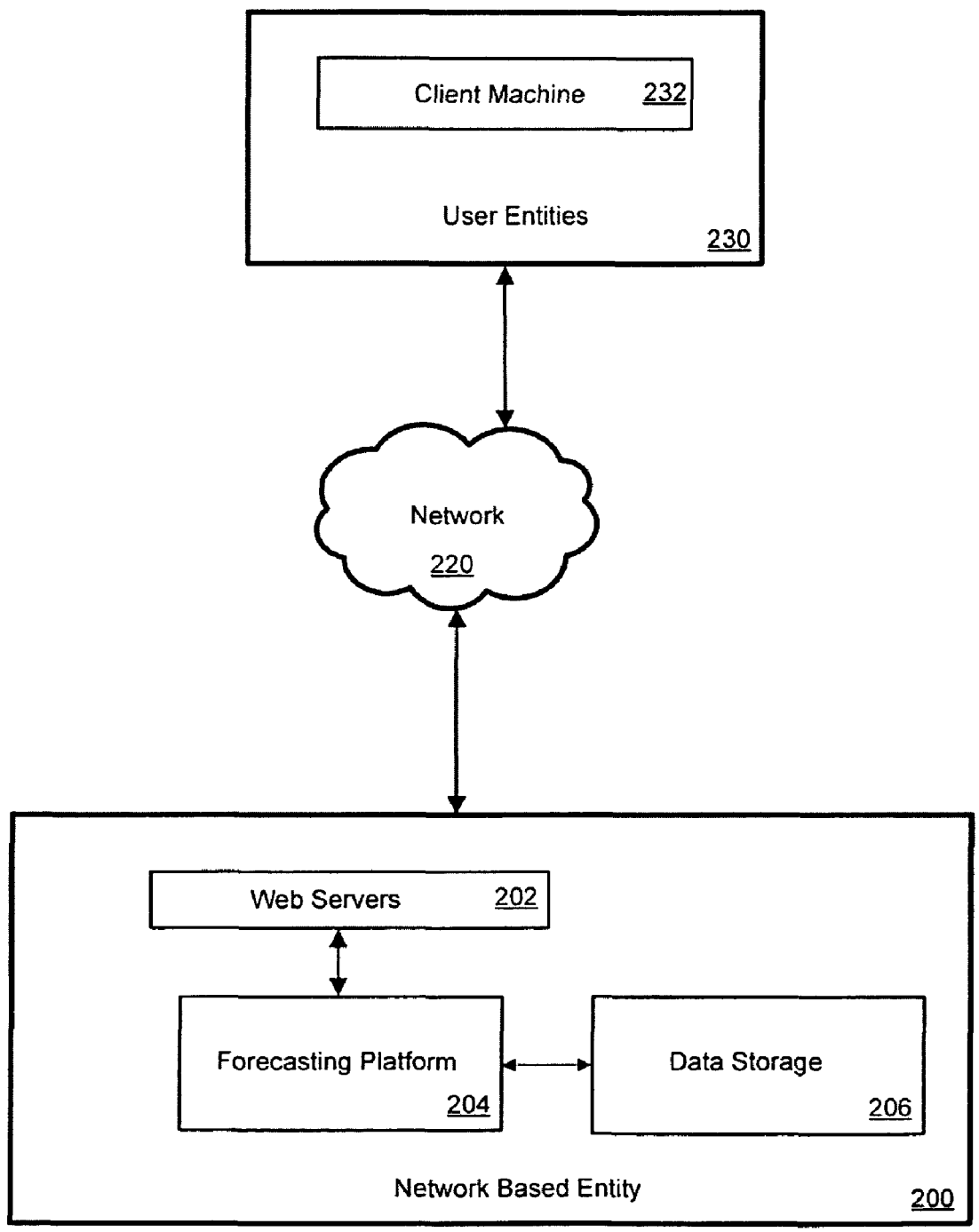
FIG. 2 is a block diagram illustrating an exemplary network-based entity containing a system to facilitate forecasting of network traffic, according to one embodiment of the invention.

FIG. 2 is a block diagram illustrating an exemplary network-based entity containing a system to facilitate forecasting of network traffic, according to one embodiment of the invention. While an exemplary embodiment of the present invention is described within the context of an entity 200 enabling such modeling and forecasting of web traffic, it will be appreciated by those skilled in the art that the invention will find application in many different types of computer-based, and network-based, entities, such as, for example, commerce entities, content provider entities, or other known entities having a presence on the network.

In one embodiment, the entity 200 is a network content service provider, such as, for example, Yahoo!® and its associated properties, and includes one or more front-end web processing servers 202, which may, for example, deliver web pages to multiple users, (e.g., markup language documents), and/or handle search requests to the entity 200, and/or provide automated communications to/from users of the entity 200, and/or deliver images to be displayed within the web pages, and/or deliver content information to the users in various formats. The entity 200 may further include other processing servers, which provide an intelligent interface to the back-end of the entity 200.

The entity 200 further includes one or more back-end servers, for example, one or more servers to maintain and facilitate access to a system to facilitate forecasting of traffic to/from the network-based entity 200, as described in further detail below. The system further comprises a forecasting platform 204 coupled to a data storage device 206. The platform 204 is further coupled to the web servers 202.

In one embodiment, the data storage device 206 is a database or a collection of databases, which may be implemented as relational databases, and may include a number of tables having entries, or records, that are linked by indices and keys. In an alternative embodiment, the database or collection of databases within the data storage device 206 may be implemented as a collection of objects in an object-oriented database.

The network-based entity 200 may be accessed by a client program, such as a browser (e.g., the Internet Explorer browser distributed by Microsoft Corporation of Redmond, Wash., Netscape's Navigator™ browser, the Mozilla™ browser, a wireless application protocol enabled browser in the case of a cellular phone, a PDA or other wireless device), that executes on a client machine 232 of a user entity 230 and accesses the entity 200 via a network 220, such as, for example, the Internet. Other examples of networks that a client may utilize to access the entity 200 includes a wide area network (WAN), a local area network (LAN), a wireless network (e.g., a cellular network), a virtual private network (VPN), the Plain Old Telephone Service (POTS) network, or other known networks.

Mean Function

A discrete time series is a set of observations x(n), each one being recorded at a specific time interval n. Let $\{X(n)\}$ be a time series with $E(X^2(n))<\infty$, its mean is defined by:

$$\mu_x(n) = E(X(n)) = \sum_{x \in S} xP(X(n) = x),$$

where S is the sample space.

Covariance Function

The covariance function of $\{X(n)\}$ is $$\gamma_x(r,s) = Cov(X(r), X(s)) = E[(X(r) - \mu_x(r))(X(s) - \mu_x(s))],$$

for integers r and s.

2.4 Autocovariance and Autocorrelation Function

The autocovariance function of a stationary time series $\{X(n)\}$ at lag h is $$\gamma_x(h) = Cov(X(r+h), X(r))$$

The autocorrelation function of a stationary time series $\{X(n)\}$ at lag h is $$\rho_x(h) = \frac{\gamma_x(h)}{\gamma_0(h)} = Cor(X(r+h), X(r))$$

Sample Mean, Autocovariance and Autocorrelation Function

Let $x(1), x(2), \ldots x(N)$ be observations of a time series. The sample mean of $x(1), x(2), \ldots x(N)$ is $$\bar{x} = \frac{1}{N} \sum_{n=1}^{N} x(n)$$

The sample autocovariance function is $$\hat{\gamma}(h) = \frac{1}{N} \sum_{j=1}^{N-h} (x(j+h) - \bar{x})(x(j) - \bar{x})$$

The sample autocorrelation function is $$\hat{\rho}(h) = \frac{\hat{\gamma}(h)}{\hat{\gamma}(0)}$$

Auto-Regressive and Moving Average (ARMA) Process
The time series $\{X(n)\}$ is an ARMA(p,q) process if it is stationary and satisfies:

$$X(n) - \phi_1 X(n-1) - \ldots - \phi_p X(n-p) = Z(n) + \theta_1 Z(n-1) + \ldots + \theta_q Z(n-q),$$

Where $\{Z(n)\}$ is Gaussian distributed with zero mean and variance $\sigma^2$.
The above equation can be written in a form $\phi(B)X(n) = \theta(B)Z(n)$, where $$\phi(z) = 1 - \phi_1 z - \ldots - \phi_p z^p,$$

$$\theta(z) = 1 - \theta_1 z - \ldots + \theta_p z^p,$$

and B is the backward shift operator defined by $$B^j X(n) = X(n-j).$$

Causality
An ARMA(p,q) process $\{X(n)\}$ is causal, if $\phi(z) = 1 - \phi_1 z - \ldots - \phi_p z^p \neq 0$ for all $|z| \leq 1$, which means, there exist constants $\{\psi_j\}$ such that $$\sum_{j=0}^{\infty} |\psi_j| < \infty$$

and $$X(n) = \sum_{j=0}^{\infty} \psi_j Z(n-j)$$

for all n.

Seasonal ARIMA Process
To model the seasonality, difference the series $\{X(n)\}$ at lag s is a convenient way of eliminating a seasonal component of period s. If d and D are nonnegative integers, then $\{X(n)\}$ is a seasonal ARIMA $(p,d,q) \times (P,D,Q)_s$ process with period s if the differenced series $Y(n) = (1-B)^d (1-B^s)^D X(n)$ is a causal ARMA process defined by:

$$\phi(B)\Phi(B^s)Y(n) = \theta(B)\Theta(B^s)Z(n)$$

Figure 3:
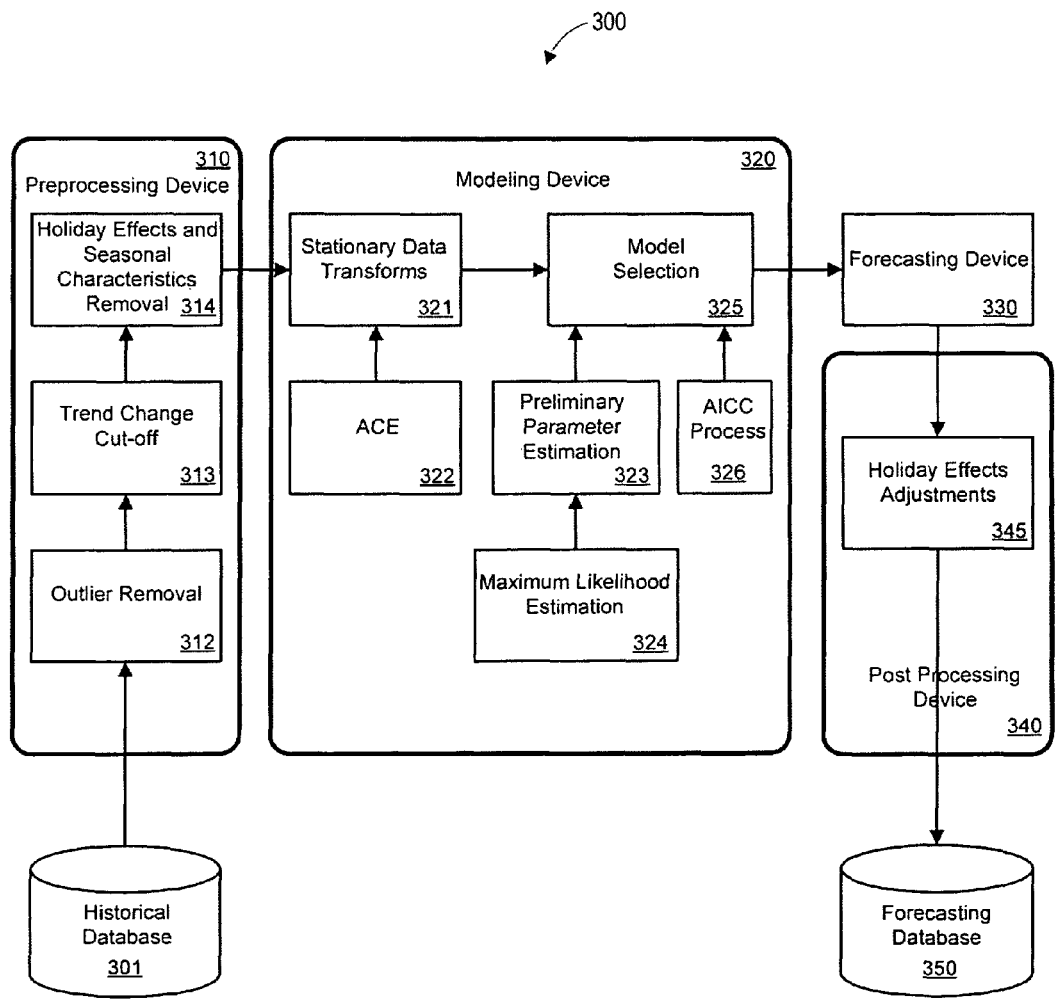
FIG. 3 is a model diagram illustrating an exemplary architecture, which implements the method to facilitate forecasting of network traffic, according to one embodiment of the invention.

FIG. 3 is a model diagram illustrating an exemplary architecture, which implements the system and method to facilitate forecasting of network traffic, according to one embodiment of the invention. As shown in FIG. 3, in one embodiment, the architecture 300 further includes a pre-processing device 310, wherein the forecasting platform 204 performs pre-processing of historical data in the historical database 301 stored within one or more data storage devices 206 shown in FIG. 2.
In one embodiment, the forecasting platform 204 retrieves the historical data from the historical database 301, which includes appropriate data storage device 206, such as, for example, a weblog. The forecasting platform 204 also examines the series of data to find any trends, seasonal components, any apparent trend changes, and any outliers.
Then, the forecasting platform 204 further performs an outlier removal procedure at processing block 312. During the outlier removal procedure, outlier data is filtered out.
Next, the forecasting platform 204 performs a trend change cut-off at processing block 313. In one embodiment, the forecasting platform 204 models and removes the trend identified at block 312.
In one embodiment, at processing block 314, the forecasting platform 204 models and removes any holiday effects and seasonal characteristics from the remaining historical data. In one embodiment, modeling and removal of trend and seasonality to obtain stationary residual data are achieved through explicit estimation of the trend and seasonality parameters. In an alternate embodiment, modeling and removal of trend and seasonality to obtain stationary residual data may be achieved through differencing of original series until the series becomes stationary.
Referring back to FIG. 3, in one embodiment, the architecture 300 further includes a modeling device 320, wherein the forecasting platform 204 performs modeling of the resulting stationary data, such as, for example, a model identification procedure and a parameter estimation procedure.
Initially, in one embodiment, the forecasting platform 204 analyzes the processed data received from block 314 and applies various known transformations to the data at processing block 321 to produce a stationary data series.
Transformations
A time series $\{X(n)\}$ can only be modeled by ARMA (p,q) process when it is stationary. If the data display characteristics suggesting nonstationary, then we need to apply transformations on it to produce a new series that is stationary. Deviation from stationary can be suggested by the graph of the series itself or by its sample autocorrelation function. A slowly decaying sample autocorrelation function suggests a trend needs to be differenced. A nearly periodic autocorrelation function suggests the existence of seasonality.
Sample Mean, Autocovariance and Autocorrelation Function
The sample autocorrelation function is further calculated as follows: Let $x(1), x(2), \ldots x(N)$ be observations of a time series. The sample mean of $x(1), x(2), \ldots x(N)$ is $$\bar{x} = \frac{1}{N} \sum_{n=1}^{N} x(n)$$

The sample autocovariance function is $$\hat{\gamma}(h) = \frac{1}{N} \sum_{j=1}^{N-h} (x(j+h) - \bar{x})(x(j) - \bar{x})$$

The sample autocorrelation function is $$\hat{\rho}(h) = \frac{\hat{\gamma}(h)}{\hat{\gamma}(0)}$$

In one embodiment, at processing block 323, the forecasting platform 204 performs a preliminary parameter estimation on the set of stationary input parameters output by block 321, followed by a maximum likelihood estimation, at processing block 324, as described in detail below.

Preliminary Parameter Estimation

For a causal ARMA (p,q) process $\phi(B)X(n)=\theta(B)Z(n)$, where $\phi(\cdot)$ and $\theta(\cdot)$ are the pth and qth-degree polynomials, we can write $$X(n) = \sum_{j=0}^{\infty} \psi_j Z(t-j),$$

where $\psi(z)$ is determined by:

$$\psi(z) = \sum_{j=0}^{\infty} \psi_j z^j = \frac{\theta(z)}{\phi(z)}$$

Or equivalently, $$(1-\phi_1 z - \ldots -\phi_p z^p)(\psi_0 + \psi_1 z + \ldots) = 1 + \theta_1 z + \ldots + \theta_q z^q.$$

Thus, we have:

$$\psi_0 = 1$$

$$\theta_j = \psi_j - \sum_{k=1}^{P} \phi_k \psi_{j-k}, j = 1, 2, \ldots$$

The steps of preliminary parameter estimation are as follows:

1. Estimate $\psi_1, \ldots \psi_{p+q}$ by using innovation algorithm as this:

$$r_0 = \hat{\gamma}(0),$$

$$\theta_{n,n-k} = \left[\hat{\gamma}(n-k) - \sum_{j=0}^{k-1} \theta_{k,k-j}\theta_{n,k-j}r_j\right]r_k^{-1}, 0 \le k < n, 0 \le k < n,$$

$$r_n = \hat{\gamma}(0) - \sum_{j=0}^{n-1} \theta_{n,n-j}^2 r_j,$$

Stop the above iteration at n=Max(16, p+q) and set $$\psi_1 = \theta_{n,1}$$
$$\psi_2 = \theta_{n,2}$$
$$\vdots$$
$$\psi_{p+q} = \theta_{p+q}$$

16 is an experience number which results reasonable result.

2. Estimate $\phi$ by solving this equation:

$$\begin{bmatrix} \theta_{m,q} & \theta_{m,q-1} & \cdots & \theta_{m,q+1-p} \\ \theta_{m,q+1} & \theta_{m,q} & \cdots & \theta_{m,q+2-q} \\ \vdots & \vdots & \cdots & \vdots \\ \theta_{m,q+p-1} & \theta_{m,q+p-2} & \cdots & \theta_{m,p} \end{bmatrix} \begin{bmatrix} \phi_1 \\ \phi_1 \\ \vdots \\ \phi_1 \end{bmatrix} = \begin{bmatrix} \theta_{m,q+1} \\ \theta_{m,q+2} \\ \vdots \\ \theta_{m,q+p} \end{bmatrix}$$

3. Estimate $\theta$ by:

$$\theta_j = \psi_j - \sum_{k=1}^{P} \phi_k \psi_{j-k}, j = 1, 2, \ldots$$

Maximum Likelihood Estimation

Parameters estimated by maximum likelihood estimators maximize the likelihood defined by:

$$L(\phi_p, \theta_q, \sigma^2) = \frac{1}{\sqrt{(2\pi\sigma^2)^n r_0 \cdots r_{n-1}}} \exp\left\{-\frac{1}{2\sigma^2} \sum_{j=1}^{N} \frac{(X(j) - \hat{X}(j))^2}{r_{j-1}}\right\}$$

We use a third party optimization package called UNCMin to maximize the likelihood. The initial input parameters are estimated by the preliminary parameter estimation introduced in the Preliminary Parameter Estimation.

Given a set of parameters $\phi_1, \ldots, \phi_p$, and $\theta_1, \ldots, \theta_q$, the steps of calculating the likelihood function is as follows:

1. Calculation of the autocorrelation function $$\gamma(k) - \phi_1 \gamma(k-1) - \phi_p \gamma(k-p) = \sigma^2 \sum_{j=0}^{\infty} \theta_{k+j} \psi_j, 0 \le k \le m,$$

$$\gamma(k) - \phi_1 \gamma(k-1) - \phi_p \gamma(k-p) = 0, k > m$$

Where m=max(p,q), and $\theta_0 = 1$, $\theta_j = 0$ for $j \notin \{0, \ldots q\}$.

2. Calculation of $r_0, \ldots, r_{n-1}$ $$\kappa(i, j) = \begin{cases} \sigma^{-2}\gamma(i-j), & 1 \le i, j \le m \\ \sigma^{-2}\left[\gamma(i-j) - \sum_{r=1}^{p} \phi_r \gamma(r - |i-j|)\right], & \min(i,j) \le m < \max(i,j) \le 2m \\ \sum_{r=0}^{q} \theta_r \theta_{r+|i-j|}, & \min(i,j) > m \\ 0 & \text{otherwise} \end{cases}$$

$$r_0 = \kappa(1, 1),$$

$$\theta_{n,n-k} = r_k^{-1}\left[\kappa(n+1, k+1) - \sum_{j=0}^{k-1} \theta_{k,k-j}\theta_{n,n-j}r_j\right],$$

$$0 \le k < n, \hat{X}(n), n = 1, n-1$$

$$r_n = \kappa(n+1, n+1) - \sum_{j=0}^{n-1} \theta_{n,n-j}^2 r_j,$$

3. Calculation of $\hat{X}(n)$, n=1, ... n−1

$$\hat{X}(n) = \begin{cases} \sum_{j=1}^{n} \theta_{nj}(X(n-j) - \hat{X}(n-j)), & 1 \le n < m \\ \phi_1 X(n-1) + \cdots \phi_p X(n-p) + \sum_{j=1}^{q} \theta_{nj}(X(n-j) - \hat{X}(n-j)), & n \ge m \end{cases}$$

In one embodiment, at processing block 325, a model is chosen to fit the residual set of results by using sample statistics. The forecasting platform 204 uses, for example, an Auto-Regressive and Moving Average (ARMA) process and a seasonal ARIMA model, but it is to be understood that other known models may be used to achieve similar results.

Model Identification of ARMA Process

The orders p and q of the ARMA process is decided by minimizing Akaike's information criterion corrected (AICC) value. The AICC is defined by $$AICC = -2 \ln L(\phi_p, \theta_q, \sigma^2) + 2(p+q+1)n/(n-p-q-2)$$

In one embodiment, the forecasting platform 204 performs the AICC process at processing block 326.

Model Identification and Parameter of Seasonal ARIMA Process

The seasonal ARIMA process $\phi(B)\Phi(B^x)Y(n)=\theta(B)\Theta(B^x)Z(n)$ can be rewritten in an equivalent form $$\phi^*(B)Y(n) = \theta^*(B)Z(n)$$

Where $\phi^*(B) = \phi(B)\Phi(B^s)$, $\theta^*(B) = \theta(B)\Theta(B^s)$ are polynomials of degree p+sP and q+sQ, respectively. They can be express in terms of $\phi_1, \ldots, \phi_p, \Phi_1, \ldots, \Phi_P, \theta_1, \ldots, \theta_q,$ and $\Theta_1, \ldots, \Theta_Q$. If p<s and q<s, then the coefficients of $\phi^*(\cdot)$ and $\theta^*(\cdot)$ are constrained by the multiplication relations:

$$\phi_{is+j}^* = \phi_{is}^* \phi_j^*, i=1, 2, \ldots; j=1, \ldots s-1$$

$$\theta_{is+j}^* = \theta_{is}^* \theta_j^*, i=1, 2, \ldots; j=1, \ldots s-1$$

We use the maximum likelihood estimator to estimate $\phi^*(\cdot)$ and $\theta^*(\cdot)$ as in section 3.3.

For order selection, we use the AICC criterion to choose p, q, P, and Q. Since there are at most p+q+P+Q non-zero parameters, the AICC is slightly different, it is defined by $$AICC = -2 \ln L(\phi_p, \theta_q, \sigma^2) + 2(p+q+P+Q+1)n/(n-p-q-P-Q-2)$$

Referring back to FIG. 3, in one embodiment, the architecture 300 further includes a forecasting device 330, wherein the forecasting platform 204 performs a prediction or forecasting procedure based on the model selected and estimated in the modeling device 320. The future values of the time series are thus calculated by forecasting the residuals according to the model and then inverting the transforms in a subsequent step to get the forecasts of the original series, as described in detail below.

Forecasting of ARMA Process

Let $P_n X(n+h)$ denote the best linear predictor of $X(n+h)$ in terms of $X(1), \ldots X(n)$, the forecasting equation using ARMA (p,q) model is as follows:

$$P_n X(n+h) = \begin{cases} \sum_{j=h}^{n+h-1} \theta_{n+h-1, j}(X(n+h-j) - \hat{X}(n+h-j)), & 1 \le h \le m-n \\ \sum_{i=1}^{p} \phi_i P_n X(n+h-i) + \\ \sum_{j=h}^{n+h-1} \theta_{n+h-1, j}(X(n+h-j) - \hat{X}(n+h-j)) & , h > m-n \end{cases}$$

Forecasting of Seasonal ARIMA (SARIMA) Process

The forecasting of SARIMA process $\{X(n)\}$ is based on the forecasting of ARMA process $\{Y(n)\}$, where $Y(n)=(1-B)^d(1-B^s)^D X(n)$. We calculate $P_n Y(n+h)$ using the forecasting equation of an ARMA process as in the Forecasting of ARMA Process. Then apply the inverse of the transformation that we used to obtain the stationary time series $\{Y(n)\}$ in the Transformations.

Finally, in one embodiment, the architecture 300 further includes a post-processing device 340, wherein the forecasting platform 204 performs any holiday effect adjustments 345 needed on the processed data to output a final set of forecasting results to the forecasting database 350.

Yearly Pattern and Weekly Pattern Modeling

For data with over 3 years of history, we can do forecasting by applying yearly pattern and weekly pattern on it by:

1. Get weekly average data from the original historical data.
2. Model and forecast the weekly average data using SARIMA(p,d,q)×(P,D,Q)$_{52}$.
3. Normalize the original historical data by weekly average.
4. Model and forecast the normalized data using SARIMA (p,d,q)×(P,D,Q)$_7$.
5. Combine the forecasting results obtained by step 2 and 4 together.

To model seasonality, at least 3 times of the seasonal length of the historical data is needed, because after applying difference, only 2 cycles of data are left. These two cycles of data are measured to fit the model.

Weekly Pattern Modeling

For data of short history, we can do forecasting using weekly model by:

1. Model and forecast the data using SARIMA(p,d,q)×(P, D,Q)$_7$.

Weekly Pattern Modeling Plus Yearly Trend

Weekly pattern can be applied on top of a yearly trend, such yearly trend may not be modeled by SARIMA(p,d,q)×(P,D, Q)$_{52}$ due to short of history.

1. Model and forecast the data using SARIMA(p,d,q)×(P, D,Q)$_7$.
2. Extract yearly pattern using existing data.
3. Combine the forecasting results by step 1 and 2.

Figure 4:
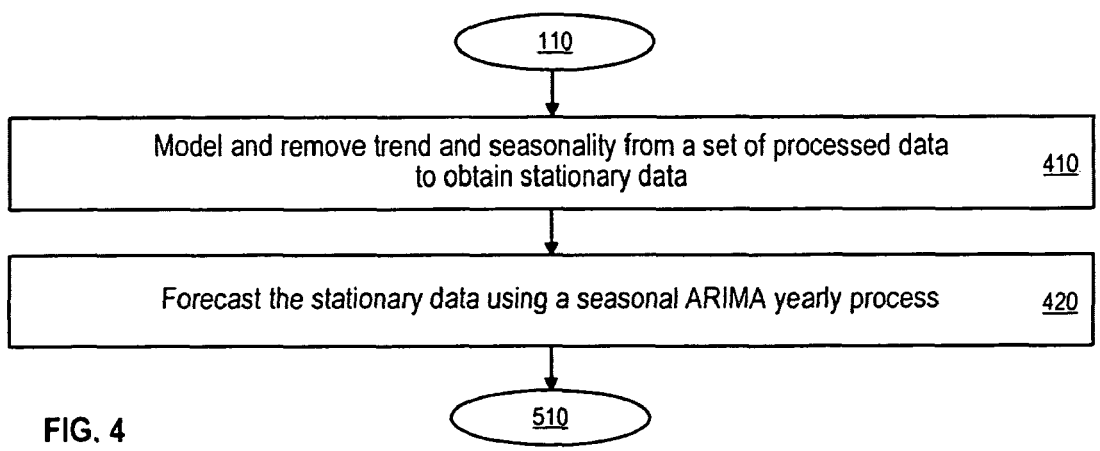
FIG. 4 is a flow diagram illustrating a method to forecast weekly average data, according to one embodiment of the invention.

FIG. 4 is a flow diagram illustrating a method to forecast weekly average data, according to one embodiment of the invention. As shown in FIG. 4, subsequent to pre-processing of the historical data to obtain processed average data, at processing block 410, trend and seasonality are modeled and removed from the set of processed data to obtain stationary data, as described above.

At processing block 420, the stationary data is forecasted using a seasonal ARIMA yearly process to obtain yearly forecast results, as described above. Then, the procedure jumps to processing block 510 shown in FIG. 5.

Figure 5:
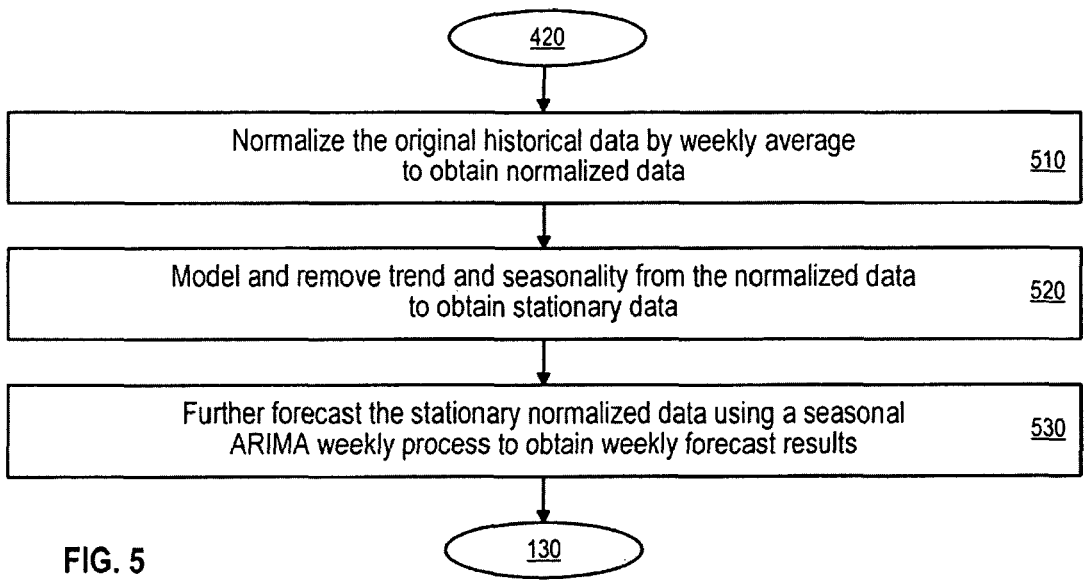
FIG. 5 is a flow diagram illustrating a method to forecast normalized data, according to one embodiment of the invention.

FIG. 5 is a flow diagram illustrating a method to forecast normalized data, according to one embodiment of the invention. As shown in FIG. 5, at processing block 510, the original historical data is normalized by weekly average to obtain normalized data.

At processing block 520, trend and seasonality are modeled and removed from the normalized data to obtain stationary normalized data, as described above. Finally, at processing block 530, the stationary normalized data is further forecasted using a seasonal ARIMA weekly process to obtain weekly forecast results, as described in detail above. Then, the procedure jumps to processing block 130 shown in FIG. 1.

Figure 6:
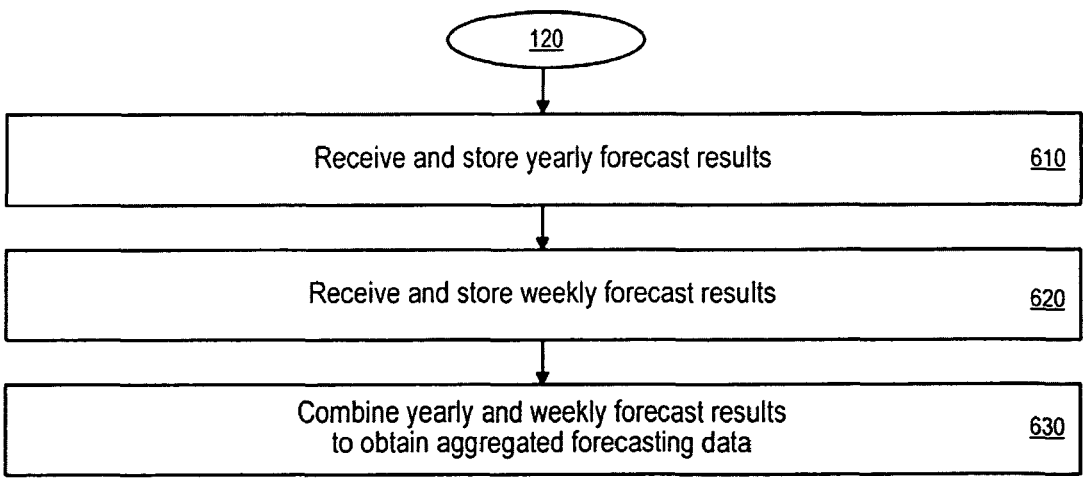
FIG. 6 is a flow diagram illustrating a method to process the forecasting results, according to one embodiment of the invention.

FIG. 6 is a flow diagram illustrating a method to process the forecasting results, according to one embodiment of the invention. As shown in FIG. 6, at processing block 610, yearly forecast results are received from the modeling device and are stored for further processing. At processing block 620, weekly forecast results are received from the modeling device and are stored for further processing. Finally, at processing block 630, the yearly forecast results and the weekly forecast results are combined to obtain aggregated or combined forecasting data to be output by the platform 204 to the entity 200.

Computer Readable Medium Implementation

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application-specific integrated circuits or by interconnecting an appropriate network of conventional component circuits, as will be readily apparent to those skilled in the art.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical disks, DVDs, CD-ROMs, micro-drives, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including but not limited to preprocessing historical data to obtain processed average data, applying modeling and forecasting techniques to the processed average data using a seasonal auto-regressive integrated moving average process, and combining the forecasting results to output combined forecasting data, according to processes of the present invention.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A computer implemented method of facilitating inventory forecasting of network traffic for a network-based entity, the method comprising:
   preprocessing, in a computer, historical data to obtain processed average data;
   applying, using a computer, modeling and forecasting techniques to the processed average data using a seasonal auto-regressive integrated moving average process to obtain forecasting results; and
   combining, in a computer, the forecasting results to output combined forecasting data, wherein the combining the forecasting results comprises receiving and storing yearly forecast results.

2. The method of claim 1, wherein the applying modeling and forecasting techniques further comprises normalizing the historical data by weekly average to obtain normalized data.

3. The method of claim 2, wherein the applying modeling and forecasting techniques further comprises modeling and removing trend and seasonality from the normalized data to obtain stationary normalized data.

4. The method of claim 3, wherein the applying modeling and forecasting techniques further comprises forecasting the stationary normalized data using a seasonal auto-regressive integrated moving average weekly process to obtain weekly forecast results.

5. The computer implemented method of claim 1, wherein the applying modeling and forecasting techniques comprises modeling and removing trend and seasonality from a set of processed data to obtain stationary data.

6. The method of claim 5, wherein the applying modeling and forecasting techniques further comprises forecasting the stationary data using a seasonal auto-regressive integrated moving average process.

7. The method of claim 1, wherein the combining the forecasting results further comprises receiving and storing weekly forecast results.

8. The method of claim 7, wherein the combining the forecasting results further comprises combining the yearly and weekly forecast results to obtain aggregated forecasting data.

9. A computer system for facilitating inventory forecasting of network traffic for a network-based entity, the computer system comprising:
   a processor and memory;
   an execution module for executing instructions comprising:
      preprocessing historical data to obtain processed average data;
      applying modeling and forecasting techniques to the processed average data using a seasonal auto-regressive integrated moving average process to obtain forecasting results; and
      combining the forecasting results to output combined forecasting data, wherein the combining the forecasting results comprises receiving and storing yearly forecast results.

10. The computer system of claim 9, wherein the applying modeling and forecasting techniques further comprises normalizing the historical data by weekly average to obtain normalized data.

11. The computer system of claim 10, wherein the applying modeling and forecasting techniques further comprises modeling and removing trend and seasonality from the normalized data to obtain stationary normalized data.

12. The computer system of claim 11, wherein the applying modeling and forecasting techniques further comprises forecasting the stationary normalized data using a seasonal auto-regressive integrated moving average weekly process to obtain weekly forecast results.

13. The computer system of claim 9, wherein the applying modeling and forecasting techniques comprises modeling and removing trend and seasonality from a set of processed data to obtain stationary data.

14. The system of claim 13, wherein the applying modeling and forecasting techniques further comprises forecasting the stationary data using a seasonal auto-regressive integrated moving average process.

15. The computer system of claim 9, wherein the combining the forecasting results further comprises receiving and storing weekly forecast results.

16. The computer system of claim 15, wherein the combining the forecasting results further comprises combining the yearly and weekly forecast results to obtain aggregated forecasting data.

17. A computer readable storage medium carrying one or more instructions for facilitating inventory forecasting of network traffic for a network-based entity, wherein the one or more instructions, when executed by one or more processors, cause the one or more processors to perform the steps of:
    preprocessing historical data to obtain processed average data;
    applying modeling and forecasting techniques to the processed average data using a seasonal auto-regressive integrated moving average process to obtain forecasting results; and
    combining the forecasting results to output combined forecasting data, wherein the combining the forecasting results comprises receiving and storing yearly forecast results.

18. The computer readable medium of claim 17, wherein the applying modeling and forecasting techniques further comprises normalizing the historical data by weekly average to obtain normalized data.

* * * * *